United States Patent [19]

Carruth, Jr.

[11] Patent Number: 4,674,068

[45] Date of Patent: Jun. 16, 1987

[54] METHOD AND APPARATUS ASSOCIATED WITH A MICROCOMPUTER SYSTEM FOR AUTOMATICALLY INDICATING A NEXT-IN-TIME POSITIONAL PARAMETER OF AN EXPLORATION SYSTEM THAT INCLUDES TWO RECORDING TRUCKS

[75] Inventor: H. T. Carruth, Jr., Anaheim, Calif.

[73] Assignee: Chevron Research Company, San Francisco, Calif.

[21] Appl. No.: 169,337

[22] Filed: Jul. 16, 1980

[51] Int. Cl.⁴ .............................................. G01N 1/36
[52] U.S. Cl. ..................................... 367/77; 362/56; 364/421
[58] Field of Search ....................... 367/14, 37, 55, 56, 367/60, 63, 71, 74, 76–80; 346/33 C; 364/421, 900, 200

[56] References Cited

U.S. PATENT DOCUMENTS

| | | | |
|---|---|---|---|
| 4,202,048 | 5/1980 | Edwards et al. | 367/60 |
| 4,214,128 | 7/1980 | Borle et al. | 367/60 |
| 4,233,677 | 11/1980 | Brau et al. | 367/15 |
| 4,257,098 | 3/1981 | Lacy | 371/33 |
| 4,280,201 | 7/1981 | Mart et al. | 367/56 |
| 4,285,052 | 8/1981 | Bobbitt | 367/56 |
| 4,320,472 | 3/1982 | Fort | 367/76 |
| 4,323,990 | 4/1982 | Goode et al. | 367/60 |

Primary Examiner—Nelson Moskowitz
Attorney, Agent, or Firm—S. R. LaPaglia; E. J. Keeling; H. D. Messner

[57] ABSTRACT

The present invention relates to a method and apparatus for generating, displaying and transmitting next-in-time from a first recording truck to a second recording truck to thereby provide coordination of operations between trucks.

5 Claims, 12 Drawing Figures

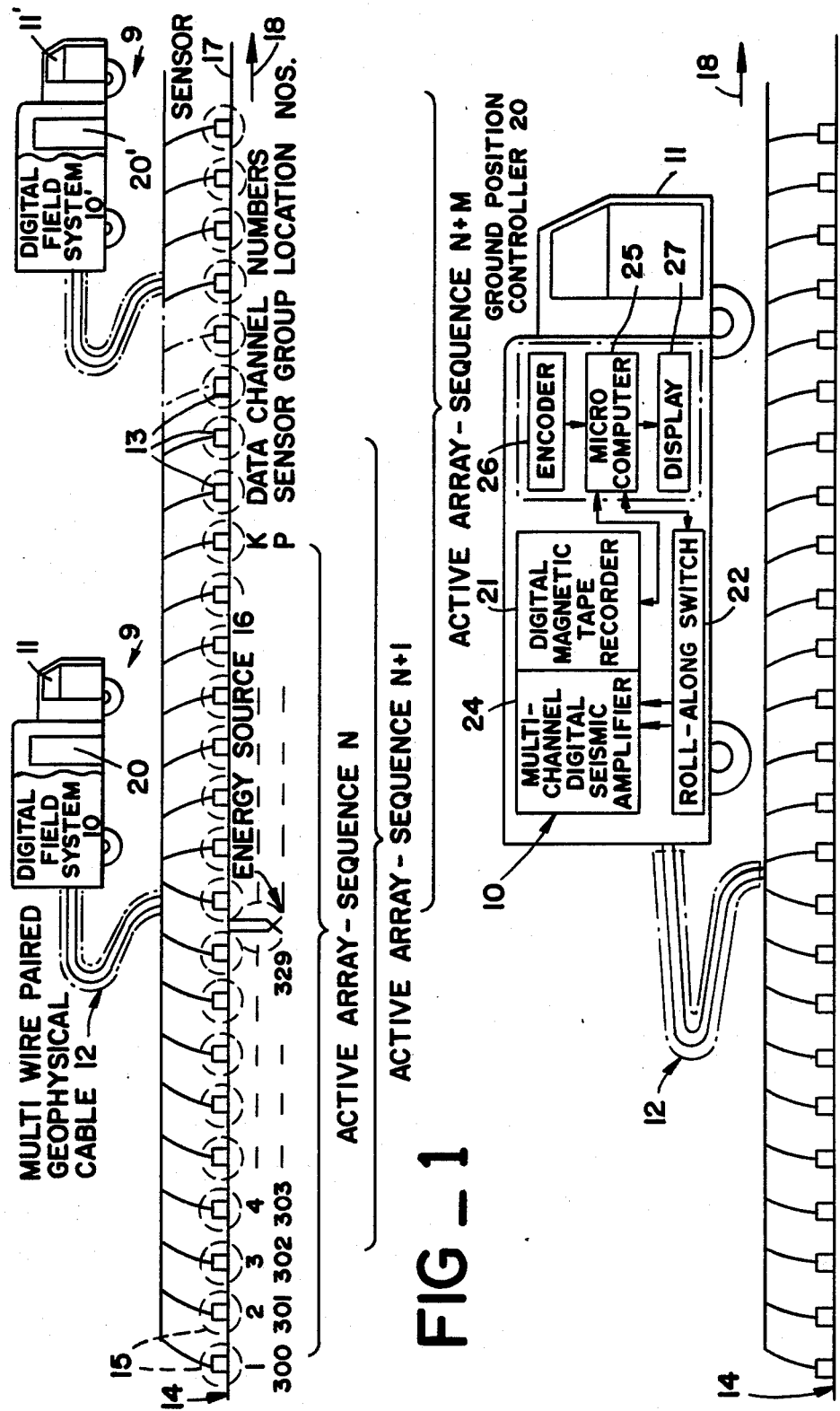

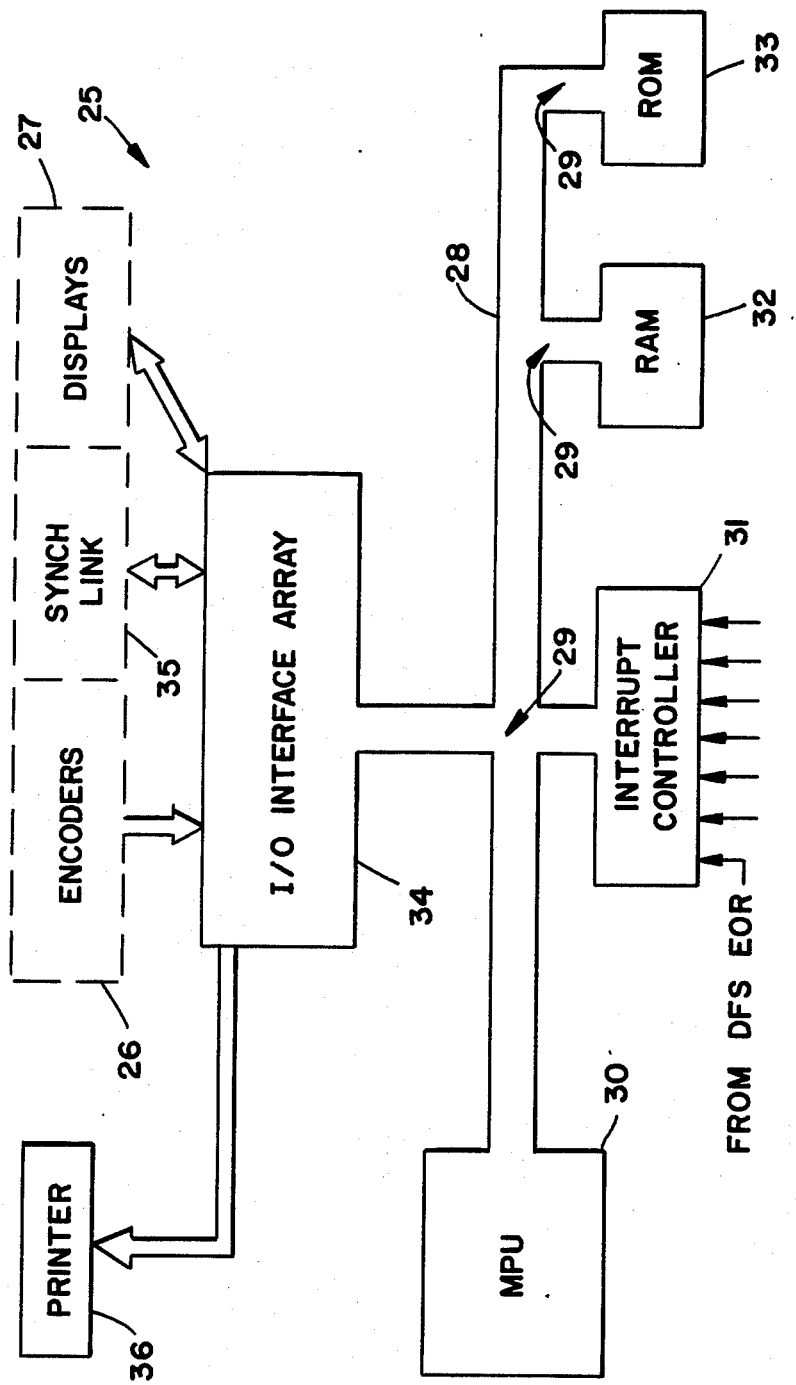

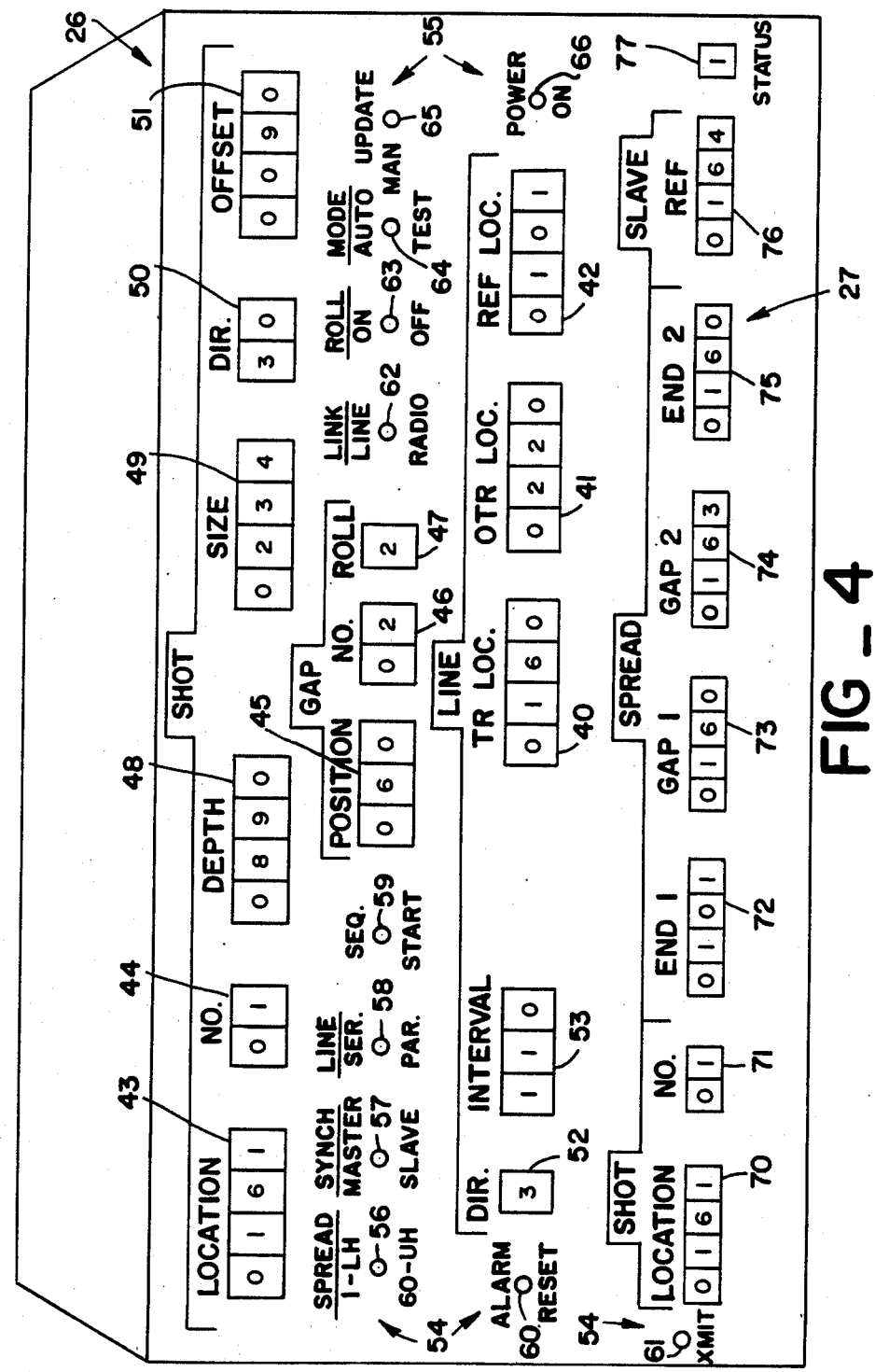
FIG_4

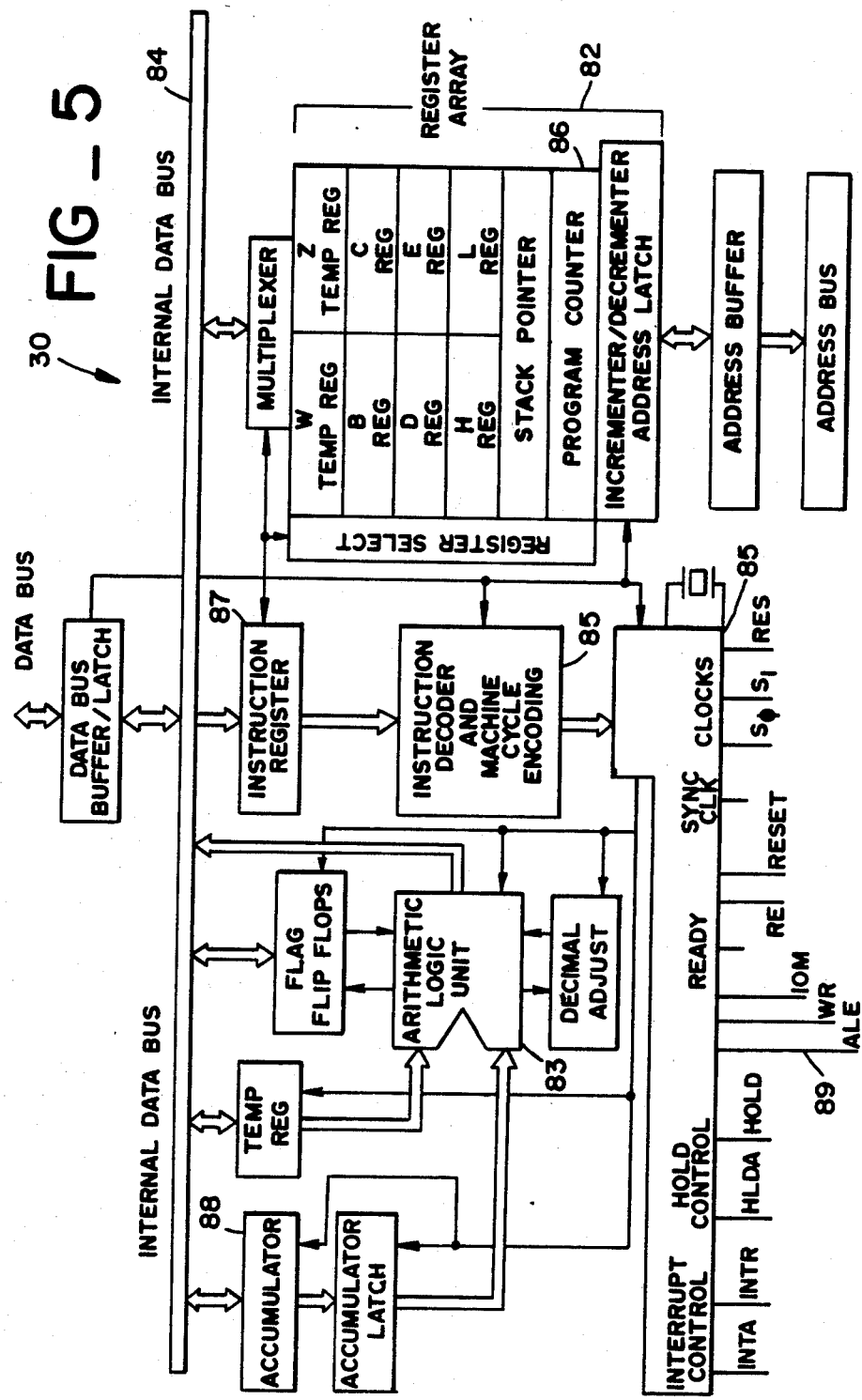

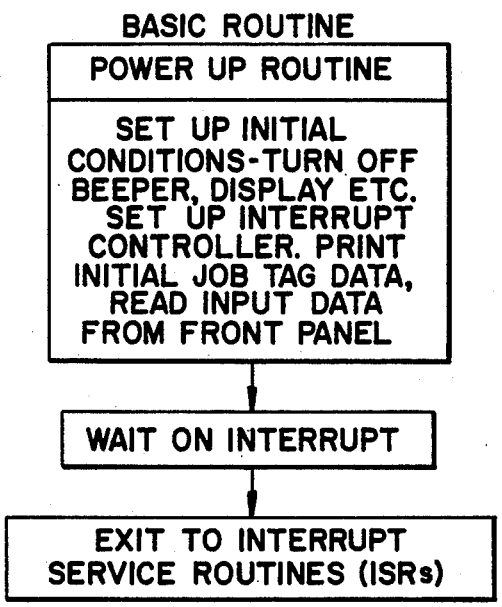
FIG_6A
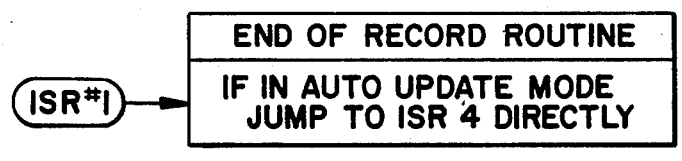
FIG_6B
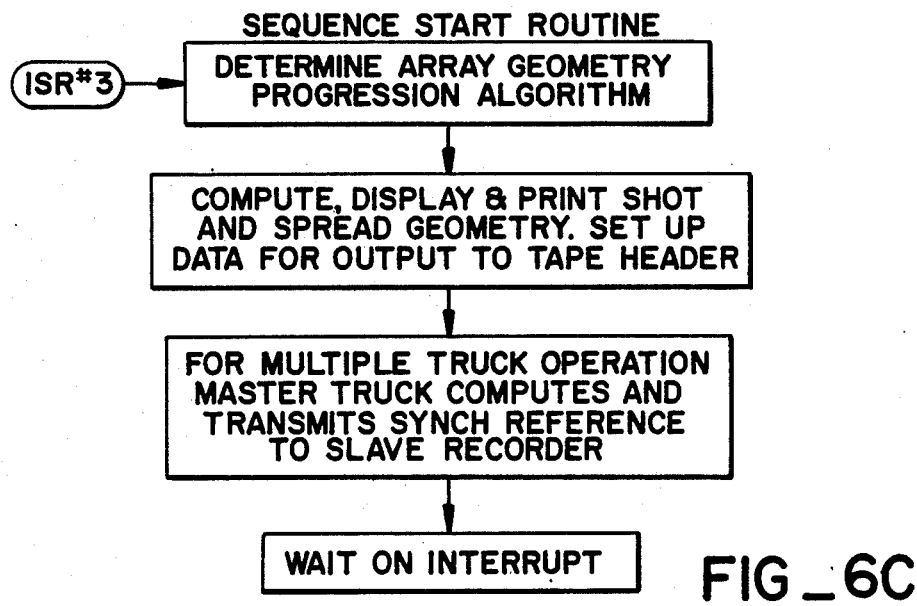
FIG_6C

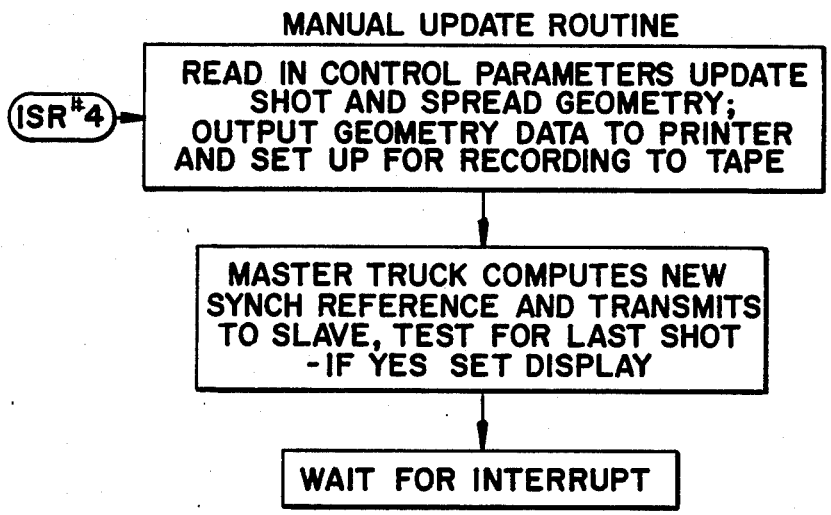
FIG_6D
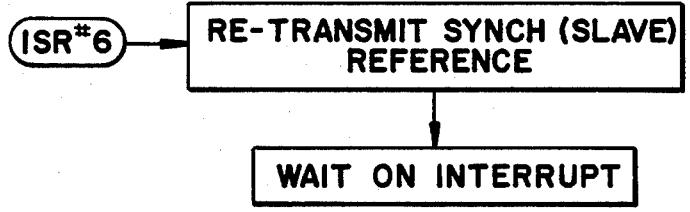
FIG_6E

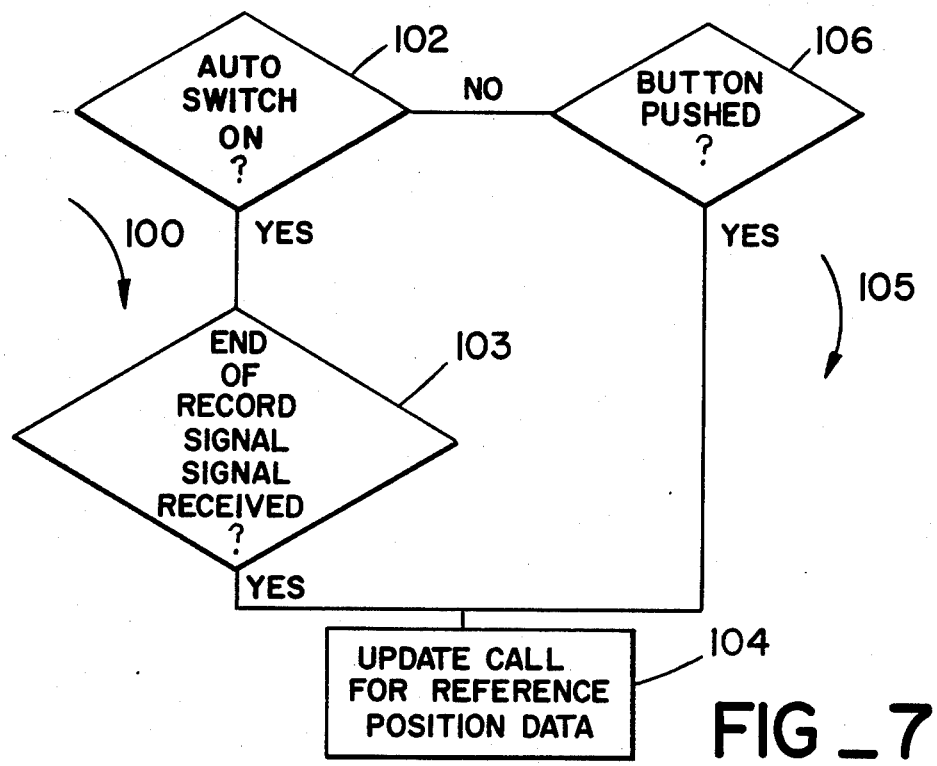
FIG_7
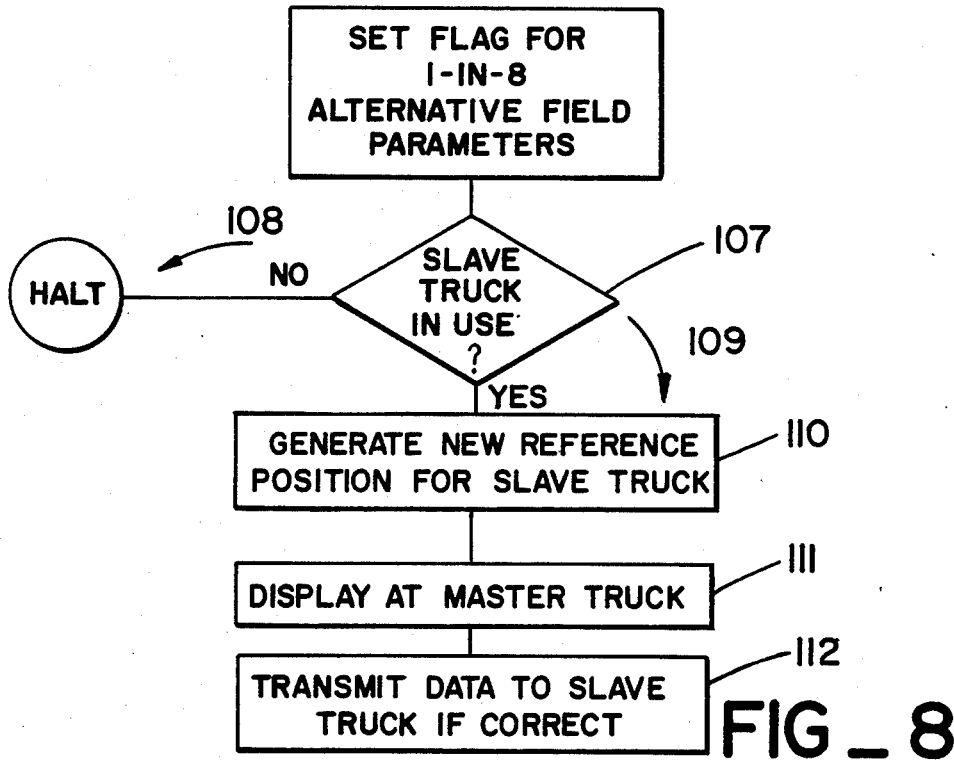
FIG_8

METHOD AND APPARATUS ASSOCIATED WITH A MICROCOMPUTER SYSTEM FOR AUTOMATICALLY INDICATING A NEXT-IN-TIME POSITIONAL PARAMETER OF AN EXPLORATION SYSTEM THAT INCLUDES TWO RECORDING TRUCKS

FIELD OF THE INVENTION

This invention relates to an improved method and apparatus for providing control of field shooting and recording operations during exploration for hydrocarbons, or the like.

RELATED APPLICATIONS

My following commonly assigned application is incorporated herein by reference: Ser. No. 169,336, July 16, 1980, now abandoned for "Ground Position Controller and Method for Automatically Indicating and Recording Parameters that Spatially Define Locations of Seismic Exploration Spread and Source Arrays".

Also, there is an additional commonly assigned application in the area of seismic exploration of interest: Ser. No. 169,345, filed July 16, 1980, for "Ground Position Controller and Method for Automatically Indicating Parameters that Spatially Cross-Reference the Locations of Seismic Spread and Source Arrays During Exploration for Hydrocarbons and the Like".

BACKGROUND OF THE INVENTION

While the above-identified ground position controller and method of my related applications provide for automatic generating, formatting, displaying and recording of seismic information (including next-in-time sensor and source array geographic locations), additional annotational problems remain. E.g., where two trucks are used in association with two ground position controllers, there must be a modification to the generation sequence to assure coordination of operations between the source-detector array of the master truck and that of the slave truck.

SUMMARY OF THE INVENTION

The present invention relates to a method and apparatus for generating, displaying and transmitting next-in-time data from a first recording truck to a second recording truck to thereby provide coordination of operations, whereby the collection of seismic data by source-detector arrays associated with them, at known locations along a line of survey, is enhanced. The reference parameter of interest is generated as bits of digital data using a microcomputer system in the first truck based usually on the occurrence of an end-of-record signal generated by circuitry associated with the digital field system (DFS), also associated with that truck. After the reference parameter has been generated and initially displayed for operator approval at the first truck, a switch is activated allowing the data to be transferred to the second truck. The operator, who receives the reference parameters at the second truck, can usually cross-check it with original data or use it to automatically initiate operations within his system.

DESCRIPTION OF THE DRAWINGS

These and other functions of the present invention will become evident to those skilled in the art from a reading of a detailed description of embodiments thereof, following a brief description of the appended drawings.

FIGS. 1 and 2 illustrate an exploration system incorporating the present invention in which a source of energy and an array of sensors connected to a recording truck, are illustrated.

FIGS. 3, 4 and 5 are diagrams of certain aspects of a microcomputer system of the present invention used within the exploration system of FIGS. 1 and 2.

FIGS. 6A–6E, 7 and 8 are flow diagrams which illustrate the method of the present invention.

DESCRIPTION OF PREFERRED EMBODIMENTS OF THE INVENTION

FIG. 1 illustrates operation of seismic exploration system 9 of the present invention.

As shown, system 9 includes digital field system 10 and 10' housed within recording trucks 11 and 11', respectively. The systems 10 and 10' are electrically sensor position and each source location associated with sensors 13 and 13' and sources 16 and 16' can be indicated using ground position controllers 20 and 20' of the present invention coordinated in operation as noted below.

FIG. 2 illustrates ground position controller 20 in more detail. Since controllers 20 and 20' are the same structurally, descriptions of one explain operations of the other, except in those instances noted below. The notable difference in operation relates to the fact that controller 20 is housed within the master truck 11 and hence, to some extent, controls operations of the controller 20' in the slave truck 11'.

Briefly, the ground position recorder 20 operates in the field to insure integrity between prescribed and actual field shooting and recording operations by a series of steps, namely, storing, manipulating, displaying, generating and testing synchronization data related (i) to field positions of the sources and sensor arrays by position number, (ii) to array and source geometrical locations (both present and next-in-time) based on field geometrical algorithms and (iii) to recording array and source parameters so that realistic annotation of the subsequently collected seismic data, can be made. For these purposes, the operator utilizes encoded data provided initially by him using encoders 26, manipulated results generated by the controller 20 based on part in stored relationships within the microcomputer 25 indicating geometrical data set forth at displays 27 and finally synchronizing operations between the trucks 11 and 11', as discussed below.

Since the present invention deals conveniently with the CDPR process, the arrays of sensors and sources of energy are continually "rolled forward" in the direction of arrow 18 using rollalong switches. That is to say, after the seismic data has been recorded at the digital tape recording unit 21 (after amplification by emplifier 24), the array of sensors 13 (and source 16) along with sensor 13' and source 16', are all "rolled forward" in the direction of arrow 18. Note that the array and source geometry are always known at the recording trucks 11 and 11' provided the positional locations of FIG. 1 for the particular active array are correctly identified and recorded during each recording cycle, via operation of the ground position controller 20 and 20', of the present invention; of particular importance is the manipulation of data associated with the field geometry of the sensors 13 and 13' and source 16 and 16', via geometrical and performance algorithms stored within microcomputers of each controller 20 and 20'.

Microcomputer 25 of controller 20 is used in the master truck to predict correct array positions as the rollalong switch 23 switches between "active" and "inactive" sensors of its source-sensor array, as well as control operations within the slave truck 11' (FIG. 1). The microcomputer 25 can also interact with the rollalong switch 22, provided the latter is capable of accepting the multi-bit codes conventionally generated by the microcomputer 25. (In this regard, an approved rollalong switch is manufactured under the tradename "Rola-long Switch", by Input-Output, Inc., Houston, Tex., and consists of a series of contacts attached to a central shaft of a stepping motor controlled via a digital input code from the microcomputer 25.)

Rollalong switch 22 usually includes a display (not shown) associated with one or two of the locational positions of the active array of sensors 13. Such display, of course, changes as the active array changes sequential pattern in the manner shown in FIG. 1. The rollalong switch 22 also includes a digital generator (not shown) for generating a second multi-bit code indicative of the position of a member of the sensor array as header indicia at the recorder 21. However, as previously mentioned, the latter digital code represents only an arbitrary number and is not a true geodytic location.

FIG. 3 illustrates microcomputer 25 of controller 20 in still more detail.

As shown, the microcomputer 25 include a system bus 28 used to connect encoders 26, displays 27 and synchronization link circuit 35 via I/O interfacing array 34 to microprocessor unit 30 (MPU) of the microcomputer 25. Also connected via the bus 28 and ports 29 are interrupt controller 31, RAM 32, ROM 33 (in addition to I/O interfacing array 34), which operates in conventional fashion to calculate, manipulate, store and coordinate operations with the exploration sequence. Note that the I/O array 34 not only links the MPU 30 with the encoders 26 and displays 27, but it is also used to provide data to the printer 36 as well as coordinate transfer of data between the trucks 11 and 11' (FIG. 1), via the synchronization link circuit 35, as explained below.

Bus 28 essentially comprises three separate buses, a data bus, an address bus and a control bus. The data bus is conventional: it not only carries information to and from MPU 30, but it is also used to fetch instructions that have been stored in ROM 33, as required, as well as carries data from/to the encoders 26 and displays 27 of FIG. 2, by way of (or independent of) RAM 32.

Addressing segments of the data is the annotations function of the address bus. It is capable of selecting a location in RAM 32 or ROM 33 or a particular address in the MPU 30 when appropriately signaled, say by interrupt controller 31.

Additionally, it should be noted, that in the present invention, interrupt controller 31 handles seven (7) vectored priority interrupts for the MPU 30, as explained below, including an end-of-record interrupt (EOR) generated by the digital field system 10 (or 10') of FIG. 1, to indicate the end of the collection cycle, and to initiate operations in the next-in-time cycle.

In general, in servicing the interrupts, preservation of program status is required and is easily carried by the MPU 30. Since the controller 31 is both vectored and priority oriented, it has the responsibility of providing vectored interrupts to the MPU 30, of identifying the nature of the interrupt, (or its branching address) and of establishing priority between competing interrupts. In particular in servicing the EOR interrupt, the steps set forth in FIGS. 6B and 6D are executed to bring about automatic updating of the array and source geometry to achieve the next-in-time collection of data, based in part on the field algorithms contained in equation sets I, II, III or IV set forth below.

FIG. 4 illustrates the nature of the data provided at encoders 26 and displays 27.

The operator initially calibrates positions of the exploration array and source with previously surveyed geograhical stations. Information has been already encoded via the encoders 26 for use by microcomputer 25 before operations begin. Encoded data at encoders 26 includes:

(i) truck location (vis-a-vis survey stations of known geographic location) encoded at encoder subelement 40;
(ii) slave truck location encoded using encoder subelement 41;
(iii) reference station location (where the end of the spread is initially positioned) encoded via encoding subelement 42;
(iv) initial location of the energy source encoded using encoder subelement 43;
(v) the number of shots or sweeps encoded at subelement 44;
(vi) the initial gap position, stored at subelement 45;
(vii) the gap spacing encoded using encoder subelement 46; and
(viii) gap roll increment encoded using subelement 47.

The operator also has the initial responsibility of encoding other data which, for the most part, does not change during the survey. In this regard, the operator may have to only initially encode shot depth and size (at subelements 48 and 49), shot direction and offset (at subelements 50 and 51) as well as data related to the spread, as to its direction (at subelement 52) and the distance between groups (at subelement 53).

Switch arrays generally indicated at 54 and 55 are also set by the operator. Data provided by these switch arrays, relate to two or three possible switch states of the switches 56–66 which are, for example, related to the type of survey and run conditions occurring after the survey is underway.

[In this regard, the functions of the switches are as follows: Switch 56 specifies line direction; switch 57 specifies truck rank, i.e. determines if the reference truck is the master (or slave) in relationship with the alternate truck; switch 58 specifies operations in either a serial or in a parallel mode, the mode being related to whether one or two arrays of geophones are used in-line or parallel to the corresponding source line; pushbutton switches 59 and 60 relate to start up and to alarm reset functions respectively; switch 59, of course, initializes operations after all synchronization has been completed; switch 60 turns off the audio alarm in the event that a signal of some importance has been generated causing the alarm to also activate; transmit switch 61 "triggers" the energy source, and is operative only after the operator is assured the correctness of the array and source positions as displayed at displays 27; switches 62 and 63 related to (i) the "trigger" link associated with the activation of the source (electrical wire-line or radio) and (ii) whether or not the roll switch 22 (FIG. 2)

is to be in an active or passive state. Three-position switch 64 establishes whether or not the operation is to be in a manual, automatic or test mode; update switch 65 operates only when the switch 64 is in the manual mode and is used (in manual mode) to initiate advances of the roll switch so as to generate new ground locations for the array after the recording cycle has been completed; and switch 66 is a conventional power-on switch.]

Displays 27 may be conventional LED segmented displays except that they are microcomputer implemented. Primary purposes of the displays 27: to provide data to the operator so that determinations as to whether or not the system is functioning correctly can be made, and to allow the operator to act as an independent cross-checker of the correctness of the displayed ground locations. The data at displays 27 relate for the most part to the type of run being undertaken and survey conditions.

[In this regard, the nature of the displays 27 is as follows: subdisplays 70 and 71 indicate shot location and number of shots per location, respectively; subdisplays 72–75 relate to geographic locations of the active array as a function of time; subdisplay 76 specifies the position of the slave reference; status subdisplay 77 specifies (by code) the occurrence of certain activities during the exploration operation which may be accompanied by an audio alarm to indicate the immediate need for operator intervention, the meaning of the status code at subdisplay 77 being as set forth below, in Table I.

TABLE I

| Code | Activity |
| --- | --- |
| 0 | Setup for sequence start operation |
| 1 | Geometrical mistie |
| 2 | Ready for update or update in progress (if in auto mode) |
| 3 | Roll Switch Moving |
| 4 | Roll Switch (Stopped in position) |
| 5 | Roll Switch Disabled |
| 6 | Slave Reference Code Received |
| 7 | Transmission Reference Error (slave reference code not received) |
| 8 | Load Ref Output At Shift Register |
| 9 | Transmit (one bit of ref code) |
| A | Gap Set Mistie |
| D | Occurrence of Last Shot |
| 1X | Beeper On With Status Displayed as to Code 0, 1, . . . 9, A, D, alone. |
| 53 | Step Roll Switch Up With Beep on and Code "3" |
| 93 | Step Roll Switch Down With Beep on and Code "3". |

[Explanation of Table I: status code "0" occurs any time that the controller 20 is powered up to cue the operator that all input data at the encoders 26 must then be set. Sequencing start button 59 terminates the cueing operation; status code "D" indicates that the last shot position is at hand and thus, the truck location and connection station vis-a-vis the array must be changed; status codes "3", "4", "5" and "53" and "93" indicate certain roll switch activities. If there are errors in the programmed exploration activity, warning codes are also generated by the status codes "1"; and "7".]

OPERATIONAL SEQUENCE

Assume the operator has initially calibrated the start-up positions of the array and source with the surveyed locations. As previously indicated in regard to FIG. 4, this entails encoding of positional data via encoders 26 in conjunction with proper setting of the switching arrays 54, 55. The result: corresponding shot, spread and associated data appear at the displays 27 due to the interaction of data relationship established through operation of the microcomputer 25 of FIG. 2. In order to better understand how the present invention uses all data, perhaps a brief overview of the hardware aspects of the microprocessor 30 is in order and is presented below in connection with FIG. 5.

It should be initially noted that MPU 30 is preferably an Intel 8085 microprocessor, a product of Intel Incorp., Cupertino, California. As is well known, it has a microprocessor and controller integrated into a single chip. It also includes an array of registers 82 tied to an ALU 83 via an internal data bus 84 controlled via control unit 85. Program counter 86 and instructional register 87 have dedicated uses; the other registers, such as accumulator 88, have more general uses. In the 8085, expanded control functions result because the low-eight (8) address bits have the capabilty of being multiplexed. Such operation occurs at the beginning of each instructional cycle; the low-eight address lines appear via ALE line 89 for control of different elements of the location, including encoders 26; displays 27, printer 36 and synchronization link 35 through I/O interface array 34.

SEQUENTIAL OPERATIONS

The foregoing operations, of course, assume that the arrays 13 and 13' of FIG. 1 and associated sources 16 and 16' are being operated in coordinate fashion.

For this purpose, a synchronization positional code must be generated within the master truck 11 for transfer and testing within the slave truck 11'. For this purpose the microcomputer system 25 of the master truck executes a series of steps which finally result in a transfer of the positional code to (and its subsequent testing within) the slave truck. Result: the source-sensor arrays of both trucks can be coordinately advanced in the direction of arrow 18 of FIG. 1.

As shown in more detail in FIG. 7, decisional step 102 is used initially to test the status of mode switch 64 of the switch array 55 associated with encoders 26 of FIG. 4. Since the mode switching state is, in the case of the foregoing description, such that automatic operations are to occur, (i.e. switch 64 is in state ONE), then the generation of an end-of-record signal (EOR) by the DFS 10 of FIG. 1 causes the loop 100 to execute step 103. New array parameters are then generated, say via step 104.

On the other hand, if mode switch 64 is in an opposite operating state (say state ZERO), step 102 executes the loop in an opposite mode via entry into loop 105. Within the loop 105, there is an initial query of the update switch status (viz., status of update switch 65 of FIG. 4) via decisional step 106. If the answer to step 106 is in the affirmative, then updating of the data via step 104 occurs. In either case, a reference position is generated and ultimately transferred to the slave truck.

Since generation of the reference, data can be the result of execution of either loop 10 or loop 105, a brief description of how such reference position code can be generated within the master truck 11, is in order and is provided in association with FIG. 8.

As shown, after the flags have been set, the decisional step at 107 tests the operative status of switch 57 of the encoders 26 of FIG. 4. If the switch 57 is disabled, there is no need to generate a reference positional code for the slave truck; so the routine aborts at 108. On the other hand, if the switch 57 is enabled, loop 109 is entered, resulting in execution of steps 110, 111 and 112 in sequence, resulting in transfer of reference positional data to the slave truck, as shown.

Of course, in the execution of step 110, 111 and 112 certain aspects of the routines set forth in FIGS. 6A and 6E, as well as the execution of certain Equations Sets A, B, C and D, come into play. With regard to the latter, note only that the solutions of each Equation Sets A, B, C or D do not require extensive annotation.

UPDATE SEQUENCE EQUATION SET A

For both the ground location numbers and data channel numbers increasing along the line of survey, the following set of equations are used by the microcomputer system of the present invention:

$$RLSP(N) = RLSP(N-1) + \text{Roll} \tag{1}$$

$$END\ 1\ (N) = END\ 1\ (N-1) + \text{Roll} \tag{2}$$

$$END\ 2\ (N) = END\ 2\ (N-) + \text{Roll if } GPNO = 0 \tag{3}$$

$$GAP\ 1 = 0 = GAP\ 2 \text{ if } GPNO > 0 \tag{4}$$

$$GAP\ 1\ (N) = GAP\ 1\ (N-1) + \text{Roll} \tag{4}$$

$$GAP\ 2\ (N) = GAP\ 2\ (N-1) + \text{Roll} \tag{5}$$

$$SHLO\ (N) = SHLO\ (N-1) + \text{Roll} \tag{6}$$

$$SHNO\ (N) = 01 \tag{7}$$

UPDATE SEQUENCE EQUATION SET B

With the ground location numbers increasing but the data channel numbers decreasing the microcomputer system uses:

$$RLSP\ (N) = RLSP\ (N-1) - \text{Roll} \tag{1}$$

$$END\ 1\ (N) = END\ 1\ (N-1) + \text{Roll} \tag{2}$$

$$END\ 2\ (N) = END\ 2\ (N-1) + \text{Roll if } GPNO = 0 \tag{3}$$

$$GAP\ 1 = 0 = GAP\ 2 \text{ if } GPNO > 0 \tag{4}$$

$$GAP\ 1\ (N) = GAP\ 1\ (N-1) + \text{Roll} \tag{4}$$

$$GAP\ 2\ (N) = GAP\ 2\ (N-1) + \text{Roll} \tag{5}$$

$$SHLO\ (N) = SHLO\ (N-1) + \text{Roll} \tag{6}$$

$$SHNO\ (N) = 01 \tag{7}$$

UPDATE SEQUENCE EQUATION SET C

With the ground location numbers decreasing but the channel numbers increasing, the microcomputer uses:

$$RLSP\ (N) = RLSP\ (N-1) + \text{Roll} \tag{1}$$

$$END\ 1\ (N) = END\ 1\ (N-1) - \text{Roll} \tag{2}$$

$$END\ 2\ (N) = END\ 2\ (N-1 - \text{Roll } GPNO = 0 \tag{3}$$

$$GAP\ 2\ (N) = GAP\ 1\ (N-1) - \text{Roll} \tag{5}$$

$$SHLO\ (N) = (N-1) - \text{Roll} \tag{6}$$

$$SHNO\ (N) = 01 \tag{7}$$

UPDATE SEQUENCE EQUATION SET D

For both ground location and data channel numbers decreasing, the microcomputer system uses:

$$RLSP\ (N) = RLSP\ (N-1) - \text{Roll} \tag{1}$$

$$END\ 1\ (N) = END\ 1\ (N-1) - \text{Roll} \tag{2}$$

$$END\ 2\ E(N) = ND\ 2\ (N-1) - \text{Roll if } GPNO = 0 \tag{3}$$

$$GAP\ 1 = 0 = GAP\ 2 \text{if } GPNO > 0 \tag{4}$$

$$GAP\ 2\ (N) = GAP\ 1\ (N-1) - \text{Roll} \tag{5}$$

$$SHLO\ (N) = SHLO\ (N-1) - \text{Roll} \tag{6}$$

$$SHNO\ (N) = 01 \tag{7}$$

Table II, defines the notations used above in connection with the equation Sets A–D:

TABLE II

| NOTATION | DEFINITION |
| --- | --- |
| SHLO | Energy source location |
| SHNO | Energy source number |
| REF | Location of reference sensor |
| ROOM | No. of rollalong switch positions available for advancing the active spread |
| TR | Ground reference for recorder location |
| PNO | Number of geophone groups in the GAP |
| GPLOC | Location of the GAP |
| K | Number of data channels in recording system (24, 48, 60, 96, 120, etc). |
| END 1 | Ground location of the geophone group interconnected through the rollalong switch to the first data channel of the recorder. |
| END 2 | Ground location of the Kth data channel |
| GAP 1 | Ground location of the data channel below the GAP on the first data channel side. |
| GAP 2 | Ground location of the data channel above the GAP toward the Kth channel. |
| RLSP | Rollalong switch position required for a desired active spread location. |
| NP | Number of rollalong switch positions available minus 1. (N-1). Rollalong switch must be configured for K+N inputs and K outputs. |
| GL(+) | Ground location numbers along the seismic line increasing numerically in the direction in which the active geophone array is advanced for each successive record sequence |
| GL(−) | Ground locations numbers decreasing numerically in the direction in which the active spread is advanced. |
| CH(+) | Seismic data channel increasing (1 to K) numerically along the active spread in the direction in which the active spread is advanced. |
| CH(−) | Seismic data channels numerically decreasing (from K to 1) in the direction in which the active spread is advanced. |

It should be understood that the invention is not directed to the specific embodiments set forth above, but that many variations are readily apparent to those skilled in the art, so thus the invention is to be given the broadest possible interpretation within the terms of the following claims.

What is claimed is:

1. Method of automatically generating next-in-time reference positional data for a source-detector array of a second recording truck("slave") commanded by a first recording truck ("master"), said reference data being identified by a multi-bit code representative of at least one of a series of positions along a line of survey, said code being generated by a microcomputer system within said first truck including an MPU, memory units, and display and switching means interconnected via a system bus; said code being transmitted to a microcomputer system in said second truck, comprising, (a) storing data in said microcomputer system of said first truck, said stored data being at least associated with said series of positions along said line of survey, (b) at the end of each collection cycle, determining as bits of digital data a next-in-time reference position for said array of said slave truck, (c) transmitting the data of (b) to said slave truck.

2. The method of claim 1 in which step (b) includes the step of displaying the generated positional data of (b) at said display and switching means of said microcomputer system at said master truck for operator inspection, which errors in the latter can be detected and corrected.

3. Method of claim 1 in which step (b) includes a precursor step of determining an operational switch status associated with a separate switch means of said display and switching means of said microcomputer system at said master truck.

4. A ground position controller for automatically testing a reference positional code that can be associated with one of a series of next-in-time positions of a source-detector array of a second recording truck ("slave"), said code being generated at a first recording truck ("master") in operatively connection wtih said second truck, comprising a microcomputer system within said first truck, said system including an MPU, memory units, display and switching means and a system bus, said display and switching means including separate encoding means for automatically encoding digital data related to array geometry and exploration parameters for repetition in correct sequence of exploration activities along said line of survey via separate source-detector array operationally connected to said first recording truck, separate display means for automatically displaying at least a portion of said encoded data in alphanumeric form including a next-in-time reference position associated with said array of said second recording truck whereby the latter data can be perused prior to actual transfer to said second truck, and corrected if required, and separate switch means connected to said MPU of said microcomputer system at said first truck for determining, on command, operational switch status whereby use of separate master and slave arrays can be specified and the prescribed operational reference signals determined.

5. Controller of claim 4 in which said display and switching means also includes further separate display means for displaying data related to next-in-time locational positions of said separate source-detector array operationally connected to said first recording truck.

* * * * *